US009337730B2

(12) United States Patent  
Hoshino

(10) Patent No.: US 9,337,730 B2
(45) Date of Patent: May 10, 2016

(54) SWITCHING POWER SUPPLY CONTROL CIRCUIT FOR CURRENT MODE SWITCHING REGULATOR

(71) Applicant: Rohm Co., Ltd., Kyoto (JP)

(72) Inventor: Kiyoaki Hoshino, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/446,662

(22) Filed: Jul. 30, 2014

(65) Prior Publication Data  
US 2015/0035510 A1 Feb. 5, 2015

(30) Foreign Application Priority Data

Aug. 1, 2013 (JP) ................................. 2013-160601

(51) Int. Cl.  
*H02M 3/157* (2006.01)  
*H02M 1/00* (2006.01)  
*H02M 3/158* (2006.01)

(52) U.S. Cl.  
CPC .............. *H02M 3/157* (2013.01); *H02M 3/158* (2013.01); *H02M 3/1588* (2013.01); *H02M 2001/0009* (2013.01); *H02M 2001/0012* (2013.01)

(58) Field of Classification Search  
CPC ............. H02M 2001/0009; H02M 2001/0012; H02M 3/1588  
See application file for complete search history.

(56) References Cited

U.S. PATENT DOCUMENTS

| | | | | |
|---|---|---|---|---|
| 6,288,524 B1* | 9/2001 | Tsujimoto | ............. | H02M 3/156 323/282 |
| 2004/0174146 A1* | 9/2004 | Leman | .................. | H02M 3/156 323/266 |
| 2006/0091875 A1* | 5/2006 | Kimura | ..................... | G05F 3/30 323/315 |
| 2010/0066328 A1* | 3/2010 | Shimizu | .............. | H02M 3/1588 323/282 |
| 2011/0188617 A1* | 8/2011 | Eklund | ................... | H03M 1/08 375/346 |
| 2012/0119719 A1* | 5/2012 | Teh | ..................... | H02M 3/1588 323/282 |
| 2014/0016373 A1* | 1/2014 | Zhang | .............. | H02M 3/33523 363/21.15 |

FOREIGN PATENT DOCUMENTS

| | | |
|---|---|---|
| JP | 2000-287439 | 10/2000 |
| JP | 2009-254047 | 10/2009 |
| JP | 2012-110119 | 6/2012 |

* cited by examiner

*Primary Examiner* — Jue Zhang  
*Assistant Examiner* — Lakaisha Jackson  
(74) *Attorney, Agent, or Firm* — Fish & Richardson P.C.

(57) ABSTRACT

A switching power supply control circuit has a switching element, a smoothing circuit, and a switching control circuit configured to control the switching element. The switching control circuit includes I-V converter configured to multiply an output current flowing into the switching element by a predetermined conversion coefficient and generating an I-V conversion voltage, an amplifier configured to amplify the sum of the I-V conversion voltage and an offset voltage and generating a current detection signal, a first DAC configured to convert a digital compensation value computed from an output voltage of the smoothing circuit to an analog converted value, a first analog comparator configured to compare the current detection signal with the analog converted value and generating a first comparison result signal, and a driver configured to control the switching element on the basis of the first comparison result signal.

12 Claims, 12 Drawing Sheets

_US 9,337,730 B2_

SWITCHING POWER SUPPLY CONTROL CIRCUIT FOR CURRENT MODE SWITCHING REGULATOR

CROSS-REFERENCE TO RELATED APPLICATIONS

This application is based upon and claims the benefit of priority from the following Japanese patent application, the entire contents of which are incorporated herein by reference.

(1) Japanese Patent Application No. 2013-160601(application date: Aug. 1, 2013)

BACKGROUND OF THE INVENTION

1. Field of the Invention

The present invention relates to a switching power supply control circuit, and more particularly, to the control circuit of a current mode switching regulator having a switching element and a smoothing circuit.

2. Description of Related Art

Switching regulators are known as voltage mode, current mode, or the like from the standpoint of the control system. The voltage mode is known to usually have simple control, but a complicated phase compensation circuit. The current mode, on the other hand, is known to have more complicated control, but a greatly simplified design of the phase compensation circuit. The current mode is also known to have line regulation; that is, little change in the output voltage when the input voltage of the switching regulator is changed.

Japanese Laid-Open Patent Publication No. 2012-110119 has claimed to reduce oscillation of the output of a power supply circuit operated by the current mode without using a high-precision DAC. Japanese Laid-Open Patent Publication No. 2000-287439 relates to a current mode switching regulator, in which a signal expressing an inductor current is offset so as not to reach a command value in the case that the signal has noise. Japanese Laid-Open Patent Publication No. 2009-254047 has offered a variety of circuits configured to convert a current flowing into an inductor of a switching regulator to a voltage. In the related art, a digital-analog converter configured to convert a digital signal to an analog signal is commonly called a "DAC" and an analog-digital converter configured to convert an analog signal to a digital signal is commonly called an "ADC," and these terms will be employed in this application.

SUMMARY OF THE INVENTION

A first object of the present invention is to facilitate comparing a detection value of a current flowing into a switching regulator circuit with a digital compensation value computed from an output voltage of a smoothing circuit. A second object is to carry out this comparison using an analog comparator without employing a high-precision DAC, and to reduce oscillation of an output voltage occurring in the smoothing circuit and improve response.

A switching power supply control circuit of an embodiment of the present invention is a switching power supply control circuit having a switching element and a smoothing circuit, in which the switching power supply control circuit has I-V converter configured to convert an output current flowing into the switching element to a voltage, the I-V converter multiplies the output current by a predetermined conversion coefficient to convert to an I-V conversion signal, an offset voltage is added to the I-V conversion signal and amplified by an amplifier, a first DAC converts a digital compensation value computed from an output voltage of the smoothing circuit to an analog value, an analog comparator compares the I-V conversion signal with the analog converted value, and the switching element is controlled on the basis of the result signal of the comparison by the analog comparator.

With the switching power supply control circuit of the present invention according to another aspect, a second DAC generates the offset voltage, and a gain G is set on the basis of $G \geq (Vdm/((2^n-1) \cdot rs \cdot Ismin))$, where G is the gain by the amplifier, rs is the conversion coefficient, n is the number of bits of the first DAC, Vdm is an output voltage range of the first DAC, and Ismin is a minimum detected current of the output current.

With the switching power supply control circuit of the present invention according to another aspect, the second DAC generates the offset voltage Vofs from a high-order bit of the digital compensation value, and the first DAC converts a digital value to the analog converted value on the basis of a low-order bit of the digital compensation value, and inputs this value to the analog comparator.

Further features, elements, steps, advantages, and characteristics of the present invention will become apparent from the detailed description of embodiments given below and the appended drawings related to these embodiments.

DETAILED DESCRIPTION OF PREFERRED EMBODIMENTS

Preferred embodiments of the present invention will be described hereinafter with reference to the appended drawings.

First Embodiment

Figure 1:
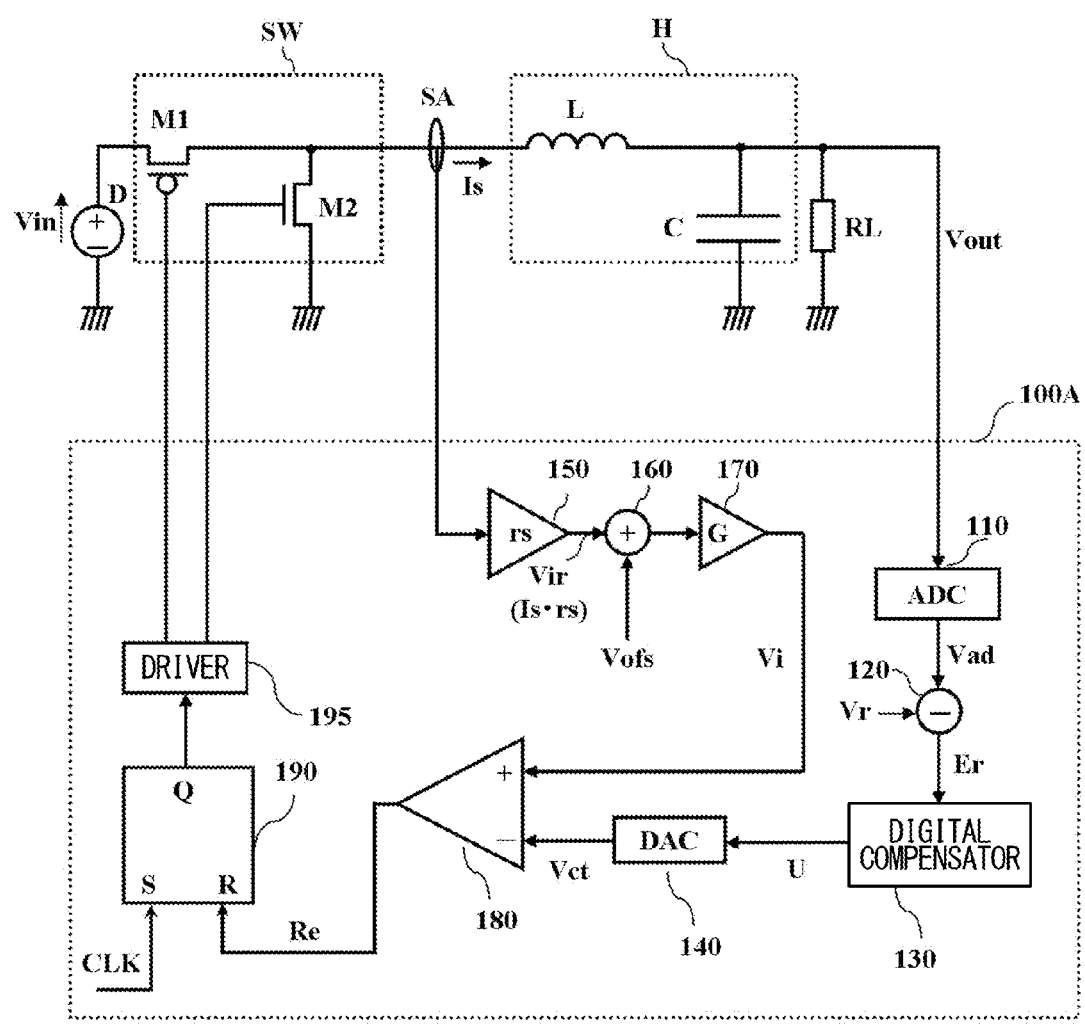
FIG. 1 A block diagram showing the overall configuration of a switching power supply control circuit according to a first embodiment of the present invention.

FIG. 1 shows a switching power supply control circuit according to the first embodiment of the present invention, and in particular, shows a pulse width modulation (PWM) current mode step-down switching regulator.

The switching power supply control circuit 10A in FIG. 1 has a switching element SW, a smoothing circuit H, and a switching controller 100A. A current sensor SA, configured to detect an output current Is, is disposed between the switching element SW and the smoothing circuit H.

The switching element SW can divide a direct current generated by a DC power source D, and is provided with a p-channel field effect transistor M1 and a n-channel field effect transistor M2.

The smoothing circuit H can smooth the direct current divided by the switching element SW, and is provided with an inductor L and a capacitor C.

The source of the p-channel field effect transistor M1 is connected to the DC power source D, to which an input voltage Vin is applied, the drain of the p-channel field effect transistor M1 is connected to the drain of the n-channel field effect transistor M2, and the source of the n-channel field effect transistor M2 is grounded. The gate of the p-channel field effect transistor M1 and the gate of the n-channel field effect transistor M2 are connected to a driver 195.

The drain of the n-channel field effect transistor M2 is connected to one terminal of the inductor L, the other terminal of the inductor L is connected to one terminal of a capacitor C, and the other terminal of the capacitor C is grounded. A load R is connected in parallel to the capacitor C.

The switching control circuit 100A also has an ADC 110 configured to carry out analog-digital (AD) conversion on the basis of an output voltage Vout of the smoothing circuit H, a subtracter 120 configured to calculate an error signal Er by subtracting a reference voltage Vr from an AD-converted output signal Vad, a digital compensator 130 configured to calculate a digital compensation value U by compensating the error signal Er, and a DAC 140 configured to carry out digital-analog (DA) conversion of the digital compensation value U. The DAC 140 converts the digital compensation value U outputted from the digital compensator 130 to an output signal Vct of the DAC 140, and inputs the converted output signal Vct to a second input terminal of an analog comparator 180. The analog comparator has been prepared configured to exercise so-called analog control, and processes continuous unsampled signals. The term analog control is used to distinguish from digital control configured to process by so-called nondiscrete sampling.

An output Q of a flip-flop 190 is inputted to a driver 195. The driver 195 controls turning on and off the switching element SW—that is, the p-channel field effect transistor M1 and the n-channel field effect transistor M2—on the basis of the output Q of the flip-flop 190.

In the case that the p-channel field effect transistor M1 has been turned on, the n-channel field effect transistor M2 is turned off, and the output voltage Vout is raised by supplying a current from the DC power source D to the capacitor C through the p-channel field effect transistor M1.

In the case that the p-channel field effect transistor M1 has been turned off, the n-channel field effect transistor M2 is turned on, and the output voltage Vout is lowered by discharging the electric charge accumulated in the capacitor C through the n-channel field effect transistor M2.

The output current Is charging the switching element SW is converted to a voltage by the I-V converter 150. The I-V converter 150 may be constructed by combining a resistor with a minute resistor and/or inductor DC resistor (DCR), a Hall element, a current transformer, an operational amplifier, and the like. The size of the I-V conversion voltage Vir outputted by the I-V converter 150 is obtained by multiplying the output current Is by a predetermined conversion coefficient rs [V/A], and is expressed by I-V conversion voltage Vir=rs×Is. In the present description, conversion coefficient rs=1 is defined as an I-V conversion voltage Vir of 1 V outputted when the output current Is is 1 A. The I-V converter 150 converts a current to a voltage according to the peak current flowing into the inductor L. Therefore, the current mode switching regulator of the present invention has a so-called peak current control switching controller. The peak current mode is known to have excellent transient response characteristics compared to an average current mode.

The output current Is is detected as the current before the current flowing into the smoothing circuit H. Specifically, a case will be described in which there is also a current flowing into the switching element SW, and the waveform of the current flowing into the present circuit is triangular. In this case, a triangular current having a maximum value and a minimum value is inputted to the I-V converter 150. Therefore, in the case that the I-V converter 150 comprise a resistor, the I-V conversion voltage Vir appears as a triangular voltage.

In the case that the peak value of the output current Is is 5 [A] and the conversion coefficient rs is set at 0.2 [V/A], the peak value of the I-V conversion voltage Vir is I-V conversion voltage Vir=rs·Is=0.2 [V/A]·5 [A]=1 [V].

With a current mode switching regulator, if minute changes in an output current flowing into a load RL can be detected, control precision is increased and the output voltage approaches a target voltage. The higher the control precision, however, the more complicated the circuit structure, leading to a higher degree of integration of the integrated circuit and higher cost.

It is demanded that the precision of the output voltage in the circuit shown in FIG. 1 be within ±2%. It is also demanded that the output current Is charging the switching element SW be controlled to a precision of, for example, ±1 [mA]. To respond to such user-demanded specifications, the present invention provides a switching regulator capable of detecting a state of variation in the output current Is of ±1 [mA] even in the case that the switching regulator control circuit uses a 10-bit DAC. For this purpose, with the switching power supply control circuit 10A according to the present invention, the I-V converter 150 multiplies the output current Is by a predetermined conversion coefficient rs to generate an I-V conversion voltage Vir. The offset voltage Vofs is further applied to a conversion voltage multiplied by the conversion coefficient rs to shift the level, and this conversion voltage shifted in level is amplified by a predetermined degree of amplification to allow the analog comparator 180 to compare this voltage with a DA converted value of the digital compensation value U to which the error signal component of the output voltage Vout has been applied. As a result, amplifying and inputting the peak value of the output current Is to the analog comparator 180 can increase the precision of comparison between the two signals.

The I-V conversion voltage Vir is inputted to one input terminal of the adder 160, and the offset voltage Vofs is inputted to the other input terminal of the adder 160. The offset voltage Vofs is prepared configured to shift the I-V conversion voltage to an intended potential. Shifting the I-V conversion voltage Vir to an intended potential allows free setting of a voltage range to be amplified by an amplifier 170, which is linked in the next step.

The amplifier 170 amplifies a conversion voltage, obtained by adding the offset voltage to the I-V conversion voltage Vir outputted by the adder 160, up to a size multiplied by a predetermined gain G. The gain G of the amplifier 170 shown in FIG. 1 indicates a fixed gain. The gain G is expressed by $G \geq Vdm/((2^n-1) \cdot rs \cdot Ismin)$, where Vdm is an output voltage range which can be fetched by the DAC 140, n is the bit number of the DAC 140, and rs is the conversion coefficient of an I-V converter 150. The output voltage range Vdm which can be fetched by the DAC 140 is the full-scale voltage value of the DAC 140, and is theoretically equal to the power supply voltage of the DAC. The bit number of the DAC 140 becomes relevant to the size of the gain G of the amplifier 170 in order that the analog comparator 180 can compare a current detection signal Vi outputted by the amplifier 170 with the output signal Vct of the DAC 140. Instead of being prepared separately, the adder 160 and the amplifier 170 may be constructed together using, for example, an operational amplifier.

In the case that the gain G is found when DAC 140 bit number n=10, output voltage range Vdm=5 [V], conversion coefficient rs=0.2 [V/A], and minimum detected current Ismin=0.001 [A], then $G \geq 24.44$ [times]. In the case that gain G is found when DAC 140 bit number n=8 and the other parameters are the same as given above, then gain $G \geq 98.04$ [times]. Similarly, in the case that a bit number n=12, n=14, or n=15 is selected, the gain G demanded by the amplifier 170 is $G \geq 6.11$ [times], $G \geq 1.53$ [times], or $G \geq 0.76$ [times]. That is, the lower the bit number n of the DAC 140, the greater the gain G found by the amplifier 170.

Two analog signals, the current detection signal Vi outputted by the amplifier 170 and the output signal Vct of the DAC 140, are inputted to the analog comparator 180. The result of comparing the two analog signals is applied to a reset terminal R of a flip-flop 190 as a reset signal Re. A clock signal having, for example, frequency f=100 kHz—that is, period T=10 µS—is inputted to a set terminal S of the flip-flop 190. The elements comprising the switching power supply control circuit 10A, beginning with the switching element SW, operate synchronized with the clock signal CLK.

FIG. 1 showed a switching power supply control circuit 10A configured to control a current mode step-down switching regulator. Specifically, FIG. 1 showed that the output voltage Vout is lower than the input voltage Vin of the DC power source D. This circuit, however, may be broadly applied to an insulated switching regulator in which a transformer is used, or a non-insulated switching power source such as a step-up switching regulator, a step-up/step-down switching regulator, or an inverting switching regulator.

Figure 2:
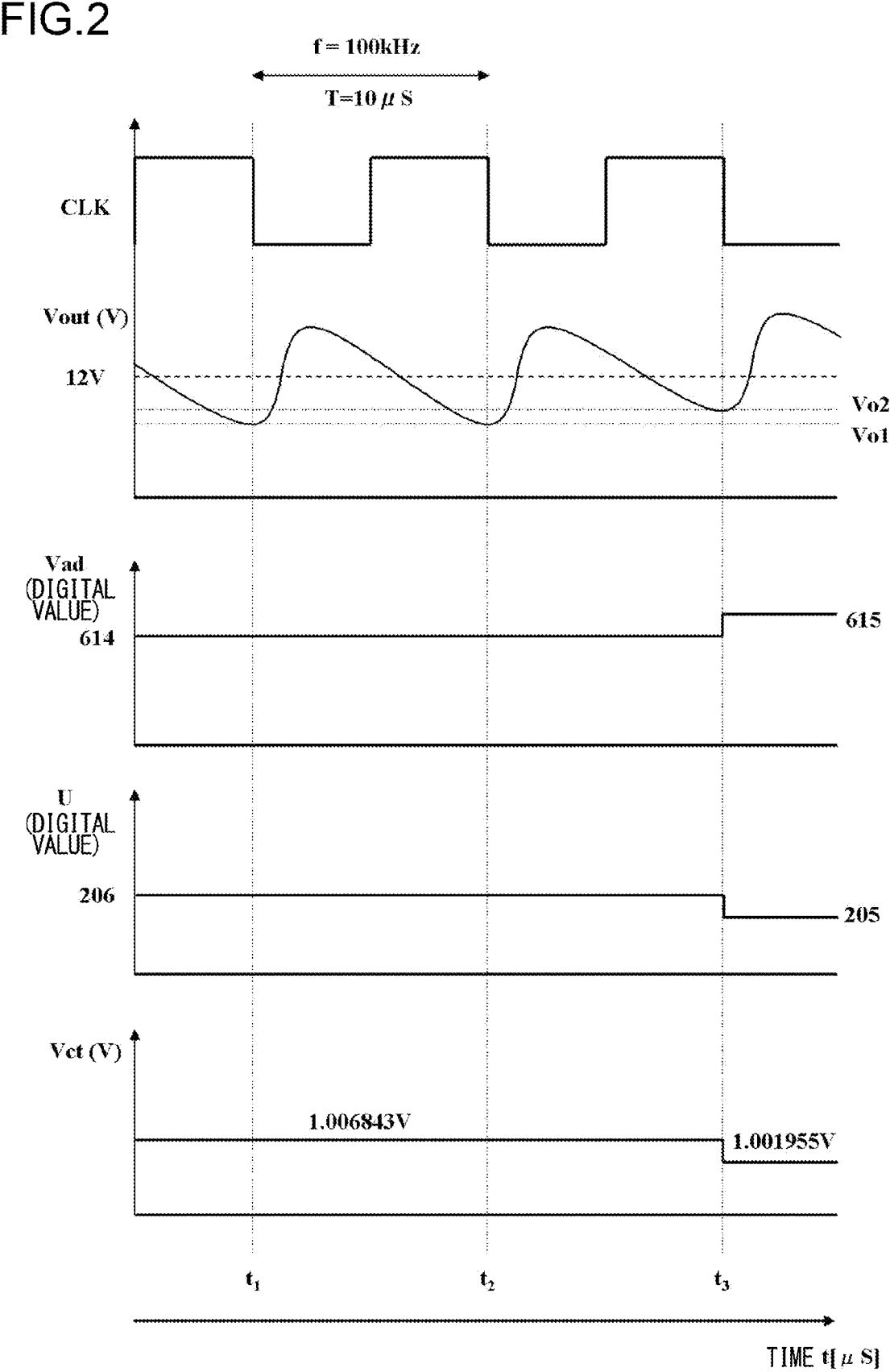
FIG. 2 A timing chart showing timing in a main node of the switching power supply control circuit according to the first embodiment of the present invention.

FIG. 2 shows the voltages (signal waveforms) in a main node of the switching power supply control circuit 10A shown in FIG. 1. The horizontal axis indicates time. FIG. 2 shows a timing chart for the clock signal CLK inputted to the set terminal S of the flip-flop 190, the output voltage Vout, the output signal Vad of the ADC 110, the digital compensation value U outputted by the digital compensator 130, and the output signal Vct of the DAC 140 in this order from top to bottom.

The clock signal CLK indicates the signal inputted to the set terminal S of the flip-flop 190. The frequency is, for example, 100 kHz; that is, period T=10 µS.

The output voltage Vout is generated by the smoothing circuit H, and applied to the ADC 110. The output voltage Vout has a central value of, for example, 12 V, and is shown schematically as a ripple voltage of about several mV weighted on either side of 12 V. The size of the ripple voltage is shown as, for example, the same as a ripple voltage Vo1 at times t1 and t2, but reaching a ripple voltage Vo2 somewhat greater than the ripple voltage Vo1 at time t3.

The output signal Vad of the ADC 110 is shown in a state transitioning from a quantifying bit number (hereafter called a digital value) 614 to a digital value 615 at time t3. At times t1 and t2, the output signal Vad outputted was the digital value 614 because the output voltage Vout was the ripple voltage Vo1, but at time t3, the output signal Vad transitioned to the digital value 615 because the output voltage Vout changed to the ripple voltage Vo2. The output signal tracks from the digital value 614 to the digital value 615 associated with the ripple voltage increasing from Vo1 to Vo2 at time t3 of the output voltage Vout. The ADC 110 is sampled at a so-called negative edge timing in which the clock signal CLK transitions from a high level to a low level. The relationship between the values of the ripple voltages Vo1 and Vo2 and the values of the digital values 614 and 615 is a matter of design, and may be suitably set by a person skilled in the art on the basis of, for example, the output voltage range of the ADC 110.

The digital compensation value U of the digital compensator 130 indicates a digital value 206 at times t1-t3, and a digital value 205 at times t3 and thereafter. The digital compensator 130 is designed to decrease the digital compensation value U as the inputted error signal Er increases, and to increase the digital compensation value U as the error signal Er decreases. Because the output signal Vad increased one digital value from the digital value 614 to the digital value 615 at time t3, the digital compensation value U of the digital compensator 130 is shown as having decreased one digital value at time t3.

The output signal Vct of the DAC 140 is shown as the digital value of the digital compensation value U of the digital compensator 130 converted in the DAC 140 to an analog value and outputted. At time t3, the output signal Vct of the DAC 140 inputted to the analog comparator 180 is reduced according to the decrease of the digital compensation value U of the digital compensator 130. The output signal Vct is a discrete value from, for example, 1.006843 V to 1.001953 V; that is, the difference is 0.00489 V. This difference is a value governed by the resolution of the DAC 140, and is $Vdm/(2^n-1)$.

Figure 3:
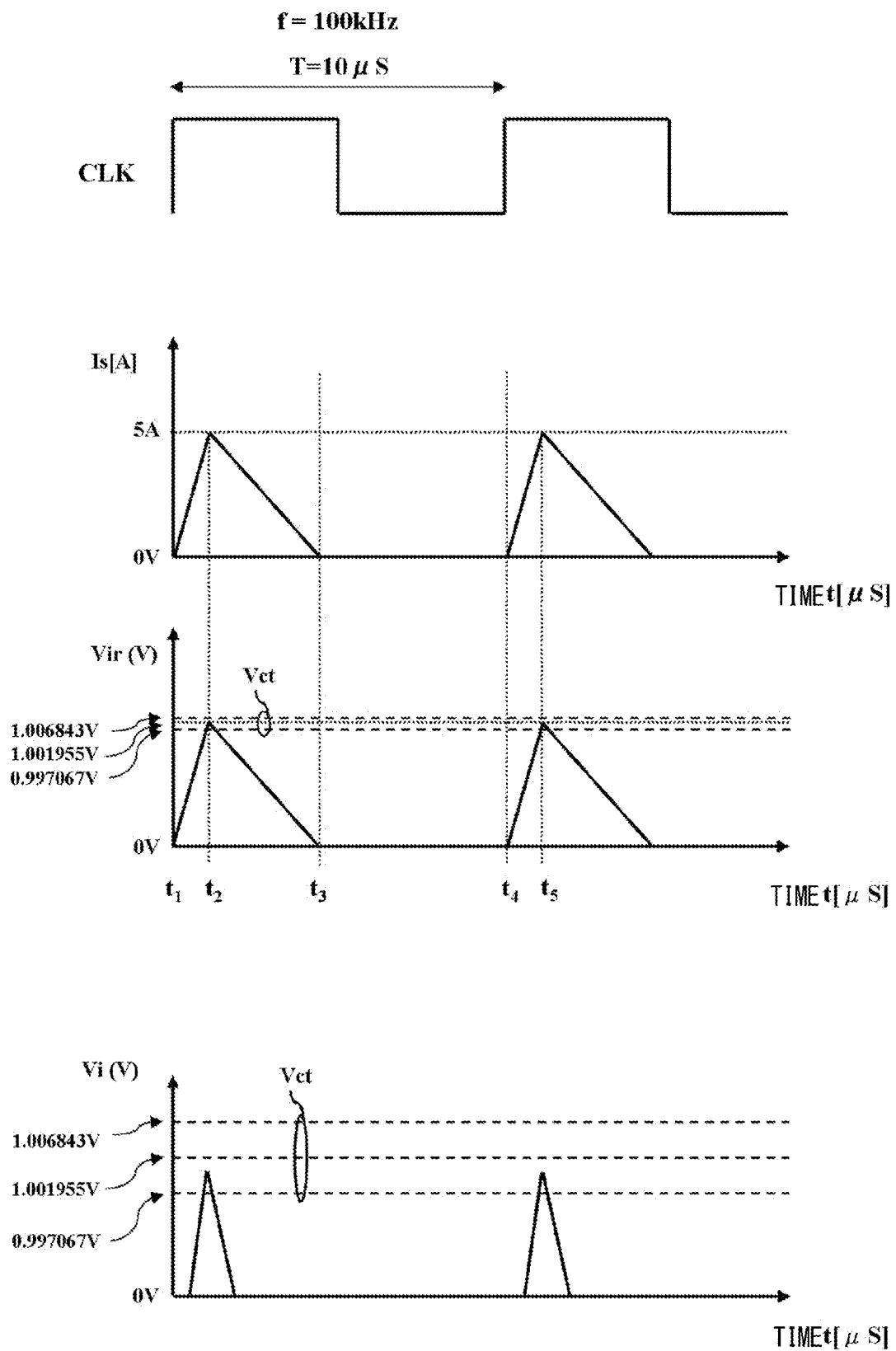
FIG. 3 A timing chart schematically showing a current flowing into an inductor L, the voltage converted waveform of this current, and the voltage waveform after offsetting in the switching power supply control circuit according to the first embodiment of the present invention.

FIG. 3 schematically shows voltage and current signals representing the I-V converter 150, the adder 160, and the amplifier 170 in the switching controller 100A shown in FIG. 1. FIG. 3 shows a timing chart for the clock signal CLK inputted to the set terminal S of the flip-flop 190, the output current Is, the I-V conversion voltage Vir, and the current detection signal Vi in this order from top to bottom.

The clock signal CLK indicates the signal inputted to the set terminal S of the flip-flop 190. The frequency is, for example, 100 kHz; that is, period T=10 µS. The output current Is reaches a peak from time t1, during which the clock signal CLK rises from a low level to a high level, to time t2, when a current starts charging, and starts gradually decreasing past time t2 moving toward time t3. At times t3-t4, the output current is nearly zero. The output current starts gradually increasing from time t4, reaches a peak at time t5, and starts decreasing toward time t6. This indicates how the output current Is changes according to the timing of the clock signal CLK.

The I-V conversion voltage Vir indicates a voltage converted and generated from a current by the I-V converter 150. The timing of the I-V conversion voltage Vir is determined according to the output current Is. Since the conversion coefficient rs is 0.2 [V/A] and the output current Is is 5 A, a voltage of nearly 1 V can be detected at the same timing as the output current Is. For example, with a 10-bit DAC, besides a value close to 1 V, the value of the I-V conversion voltage Vir separately indicates the output signal Vct of the DAC 140. Both voltages are indicated for the purpose of comparing the two voltages by the analog comparator 180. In this example, when the output signal Vct of the DAC 140 is indicated as close to 1 V, discrete values of 1.006843 V, 1.001955 V, and 0.99706 V are suitably fetched.

The offset voltage Vofs causes the I-V conversion voltage Vir to shift by a predetermined voltage portion. The offset voltage is set to a direct-current voltage nearly equal to the peak value of the I-V conversion voltage Vir. The current detection signal Vi indicates a signal in which the I-V conversion voltage Vir has been amplified by the amplifier 170 after applying the offset voltage Vofs. As a result, at time t2, the current detection signal Vi indicates a result closer to 1 V than the I-V conversion voltage Vir.

Figure 4:
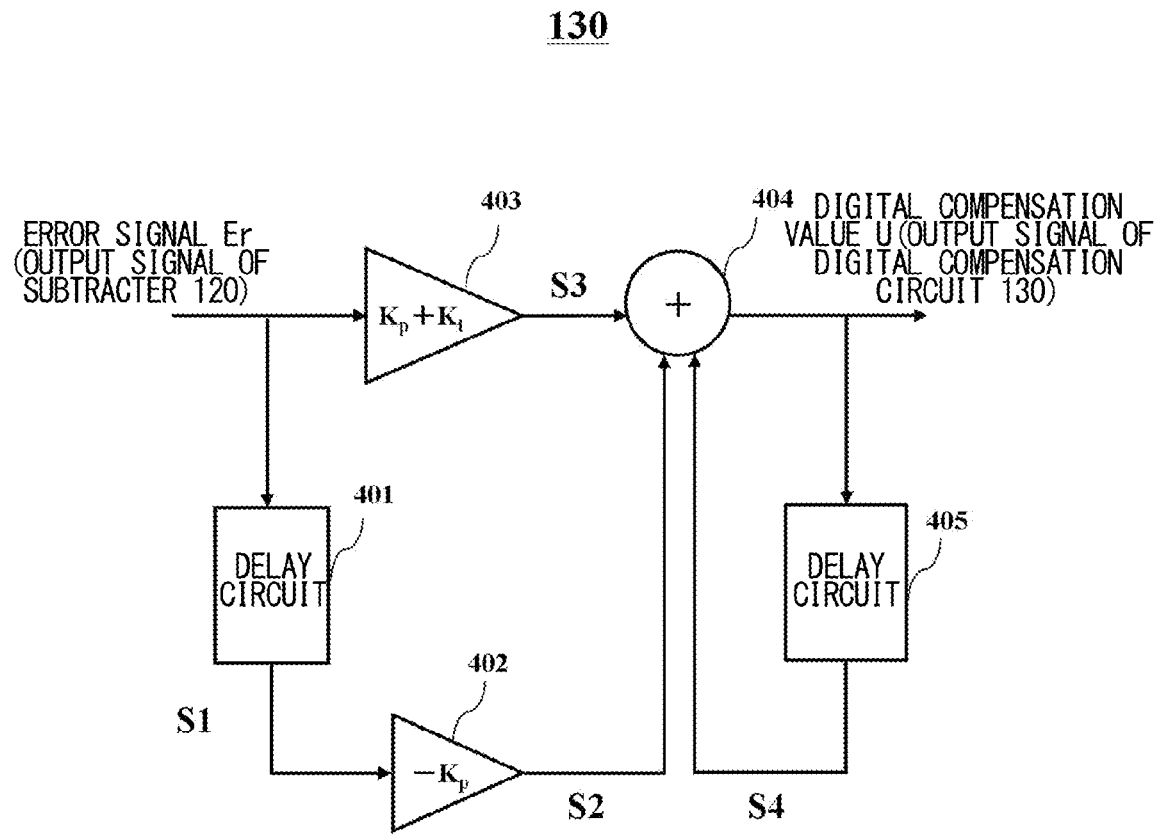
FIG. 4 A block diagram showing an example of a digital compensator in the switching power supply control circuit according to the first embodiment of the present invention.

FIG. 4 shows an example of the digital compensator 130 shown in FIG. 1. Control methods such as proportional (P) control, proportional integral (PI) control, or proportional integral differential (PID) control are generally known as control methods in a digital circuit. FIG. 4 shows a so-called PI control method using a proportional integral system.

FIG. 4 shows the error signal Er, delay circuits 401 and 405, multipliers 402 and 403, an adder 404, and the digital compensation value U. A D flip-flop, for example, is used for the bit-number portion of the delay circuits 401 and 405.

The circuit operation of the digital compensation circuit 130 in FIG. 4 will be described. In the case that the frequency is 100 kHz, for example, the error signal Er is processed every 10 μS per cycle on the basis of the clock signal CLK inputted to the set terminal S of the flip-flop 190. The error signal Er is inputted to the delay circuit 401, and a delay signal S1 of the previous cycle is outputted. The multiplier 402 multiplies the delay signal S1 of the previous cycle by a negative constant of proportionality –Kp, and outputs a multiplication signal S2 comprising the output signal of the multiplier 402. The error signal Er is inputted to the multiplier 403, which outputs a multiplication signal S3 comprising the result of multiplying the sum of a constant of proportionality Kp and a constant of integration Ki by the error signal Er. The adder 404 calculates a value (S2+S3) in which the multiplication signal S2 outputted by the multiplier 402 is added to the multiplication signal S3 outputted by the multiplier 403. The digital compensation value U outputted by the digital compensator 130 is inputted to the delay circuit 405, and a delay signal S4 of the previous cycle is outputted. The adder 404 then operates on the multiplication signal S2 outputted by the multiplier 402, the multiplication signal S3 outputted by the multiplier 403, and the delay signal S4 of the previous cycle outputted by the delay circuit 405 to compute the digital compensation value U.

Figure 5:
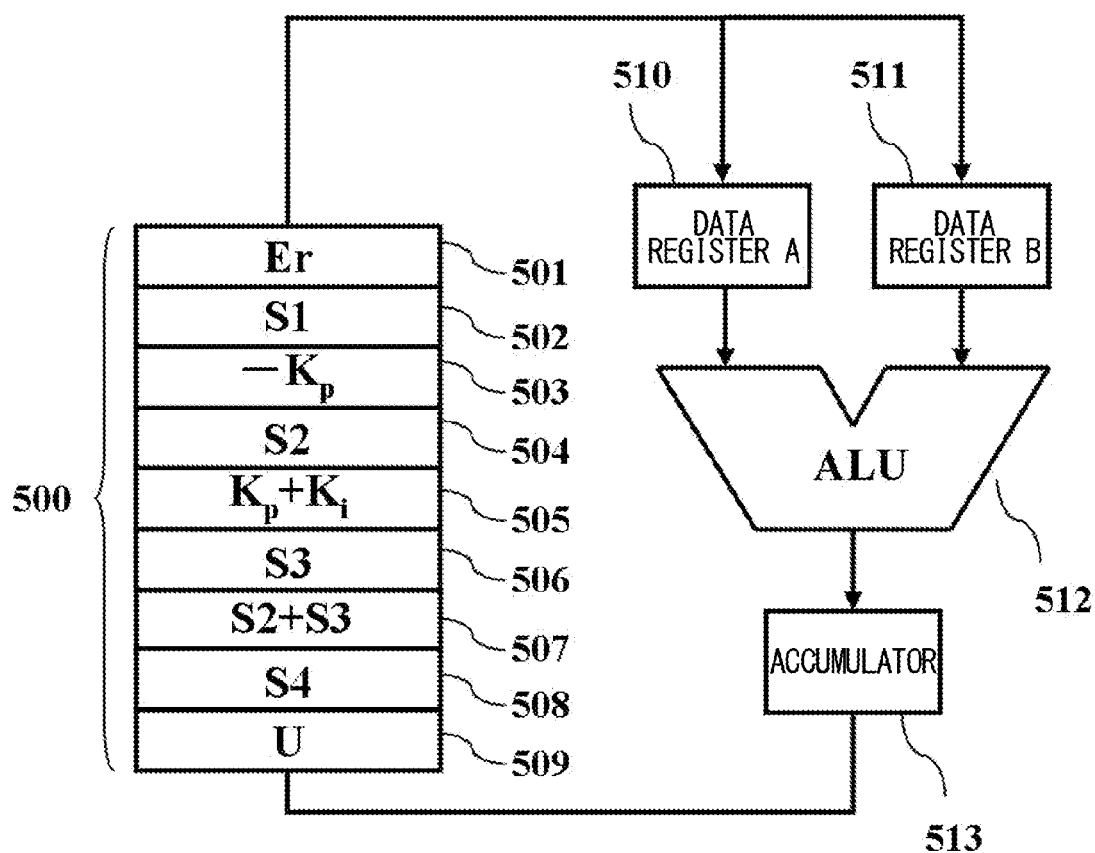
FIG. 5 A block diagram showing a specific circuit structure of the digital compensator 130 shown in FIG. 4.

FIG. 5 is a block diagram showing the schematic configuration of a PI control digital compensator 130 configured to exercise control using a CPU or the like. Where two multipliers 402 and 403 were used in FIG. 4 described earlier, the only multiplier in FIG. 5 is an arithmetic logic unit (ALU) 512, which decreases the scale of the circuit. In the case that the frequency is 100 kHz, for example, the error signal Er is processed every 10 μS per cycle on the basis of the clock signal CLK inputted to the set terminal S of the flip-flop 190.

The digital compensator 130 shown in FIG. 5 has a register group 500. Registers 501-509, for example, are prepared in the register group 500. The first register 501 stores the error signal Er. The second register 502 stores the delay signal S1 of the previous cycle. The third register 503 stores the negative constant of proportionality –Kp. The fourth register 504 stores a multiplication signal S2 comprising the product of the negative constant of proportionality Kp and the delay signal S1 of the previous cycle. The fifth register 505 stores the sum of the constant of proportionality Kp and the constant of integration Ki. The sixth register 506 stores the multiplication signal S3 of the sum of the constant of proportionality Kp and the constant of integration Ki multiplied by the error signal Er. The seventh register 507 stores the sum (S2+S3) of the multiplication signal S2 of the stored in the fourth register 504 and the multiplication signal S3 stored in the sixth register 506. The eighth register 508 stores the delay signal S4 of the previous cycle. The ninth register 509 stores the digital compensation value U. A data register 510 and a data register 511 temporarily store the values outputted by the various registers. An ALU 512 carries out arithmetical operations on the values stored in the data register 510 and the data register 511. An accumulator 513 temporarily stores the arithmetic result of the ALU 512. The ALU 512 can add, subtract, multiply, and divide.

The circuit operation will be described through output of the digital compensation value U of the digital compensation circuit 130 in FIG. 5.

The error signal Er of the previous cycle for the value stored in the second register 502 is stored in the data register 510. The value of the negative constant of proportionality –Kp stored in the third register 503 is stored in the data register 511. The ALU 512 multiplies the values in the data registers 510 and 511, and the resulting multiplication signal S2 outputted by the ALU 512 is stored in the accumulator 513. The multiplication signal S2 outputted from the accumulator 513 by the ALU 512 is then stored in the fourth register 504. Next, the error signal Er outputted by the subtracter 120 and stored in the first register 501 is stored in the data register 510. The sum of the constant of proportionality Kp and the constant of integration Ki stored in the fifth register 505 is stored in the data register 511. The ALU 512 multiplies the error signal Er stored in the data register 510 by the sum of the constant of proportionality Kp and the constant of integration Ki stored in the data register 511, and the resulting multiplication signal S3 outputted by the ALU 512 is stored in the accumulator 513. The multiplication signal S3, comprising the calculation outputted to the accumulator 513, is outputted to the sixth register 506.

The multiplication signal S2 stored in the third register 504 is stored in the data register 510. The multiplication signal S3 stored in the sixth register 506 is stored in the data register 511. The ALU 512 finds the sum of the multiplication signal S2 stored in the data register 510 and the multiplication signal S3 stored in the data register 511, and outputs the calculation result (S2+S3) to the accumulator 513. The value (S2+S3) stored in the accumulator 513 is then stored in the seventh register 507. The value (S2+S3) stored in the seventh register 507 is stored in the data register 510, and the value of the delay signal S4 of the previous cycle stored in the eighth register 508 is stored in the data register 511. The ALU 512 finds the sum of the data registers 510 and 511, and outputs the value of the calculation result (S2+S3+S4) to the accumulator 513. The value of the calculation result (S2+S3+S4) in the accumulator 513 is stored in the digital compensation value U of the ninth register 509. The digital compensation value U stored in the ninth register 509 is outputted as the DAC 140.

Figure 6:
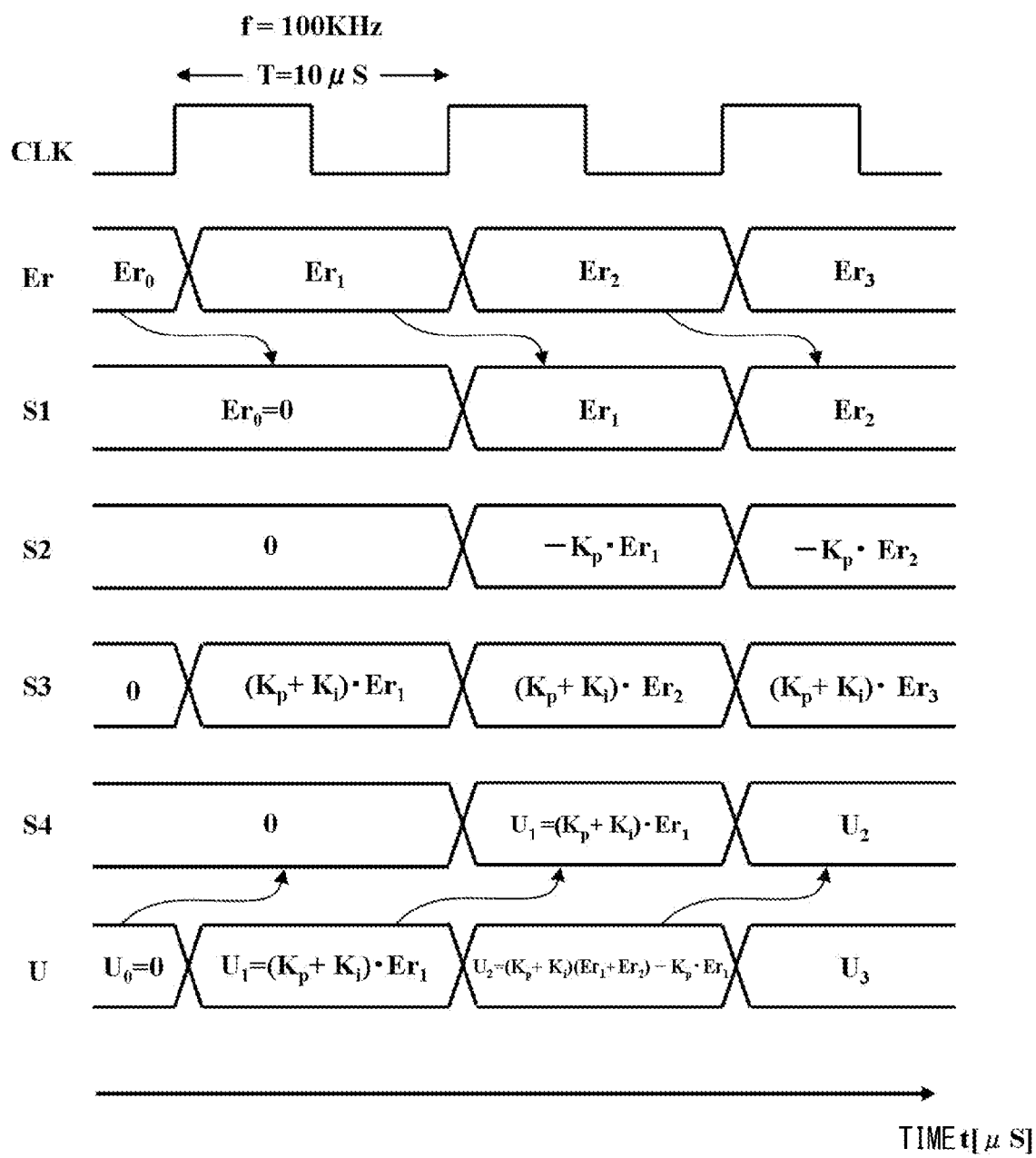
FIG. 6 A block diagram showing another specific circuit structure of the digital compensator 130 shown in FIG. 4.

FIG. 6 shows a timing chart of the PI control circuit in the digital compensator 130 of FIGS. 4 and 5. In the case that the frequency is 100 kHz, for example, the error signal Er is detected and processed every 10 µS per cycle on the basis of the clock signal CLK inputted to the set terminal S of the flip-flop 190.

FIG. 6 shows the clock signal CLK, the error signal Er, the delay signal S1 of the previous cycle of the clock signal CLK inputted to the set terminal S of the flip-flop 190, the multiplication signal S2 expressing the product of the error signal Er and the sum of the constant of proportionality Kp and the constant of integration Ki, the multiplication signal S3 expressing the product of the error signal Er and the negative constant of proportionality Kp, the delay signal S4 of the previous cycle, and the digital compensation value U in this order from top to bottom.

The clock signal CLK indicates the signal inputted to the set terminal S of the flip-flop 190. The frequency is, for example, 100 kHz; that is, period T=10 µS.

For the error signal Er, the error signal Er is inputted at every period of the clock signal CLK. The delay signal S1 of the previous cycle indicates the error signal Er of the previous cycle. The multiplication signal S2 indicates the value of the negative constant of proportionality −Kp multiplied by the delay signal S1 of the previous cycle. The multiplication signal S3 indicates the value of the error signal Er multiplied by the sum of the constant of proportionality Kp and the constant of integration Ki. The delay signal S4 of the previous cycle indicates the value of the previous cycle for the digital compensation value U. The digital compensation value U indicates the sum of multiplication value S2, the multiplication value S3, and the delay signal S4 of the previous cycle.

There is a trade-off between P control, which has low precision, but high integration, and PID control, which has high precision, but low integration. Therefore, PI control, which has good precision and integration, is used in the present invention.

Second Embodiment

Figure 7:
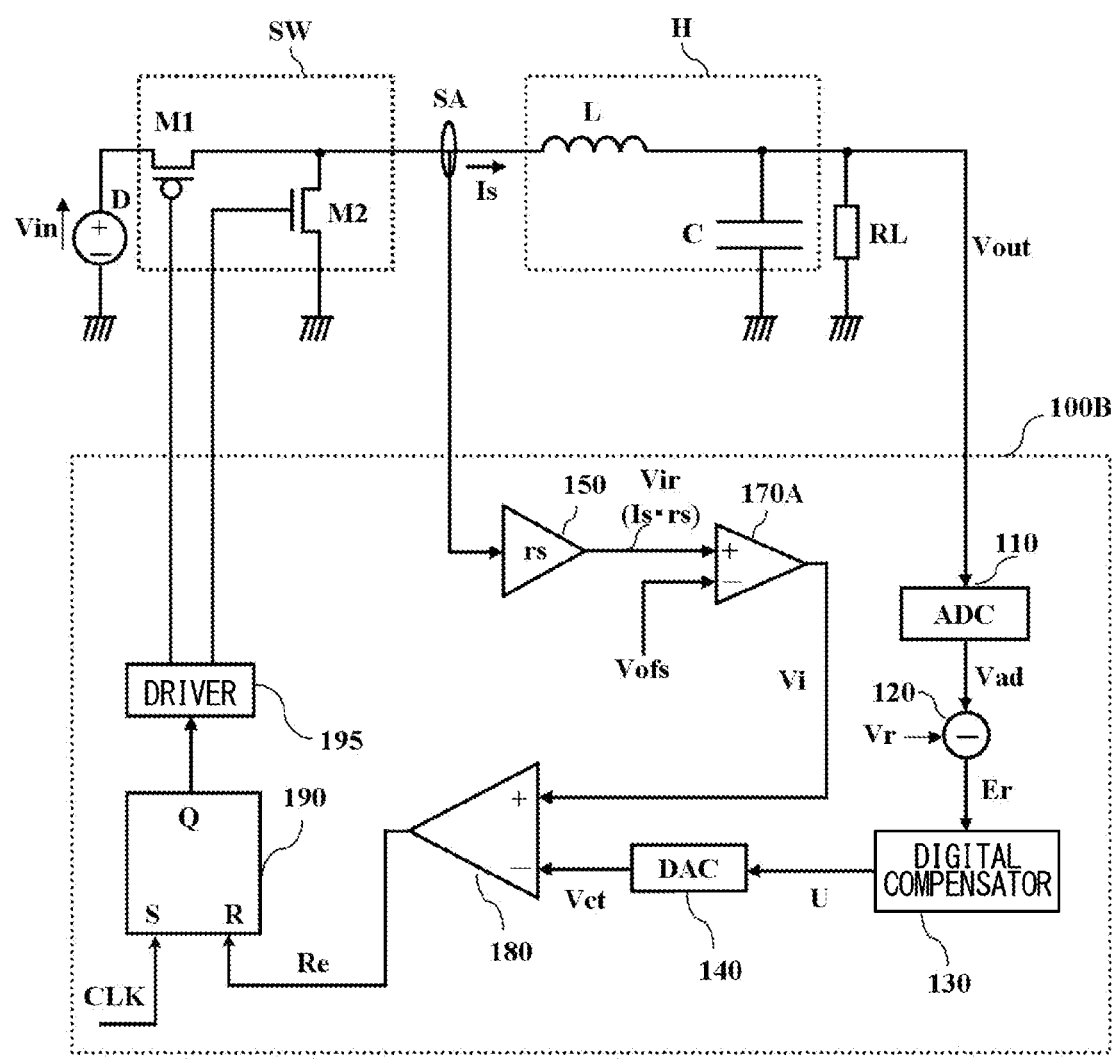
FIG. 7 A block diagram showing the overall configuration of a switching power supply control circuit according to a second embodiment of the present invention.

FIG. 7 shows a switching power supply control circuit 10B according to a second embodiment of the present invention. The difference from the first embodiment (FIG. 1) is that a switching controller 100B has an operational amplifier 170A comprising an amplifier between the I-V converter 150 and the analog comparator 180. Specifically, the operational amplifier 170A shown in FIG. 7 has the functions of both the adder 160 and the amplifier 170 shown in FIG. 1. The circuit structure can be simplified by inputting the I-V conversion voltage Vir to a non-inverting input terminal of the operational amplifier 170A, and applying the offset voltage Vofs to this inverting input terminal.

Third Embodiment

Figure 8:
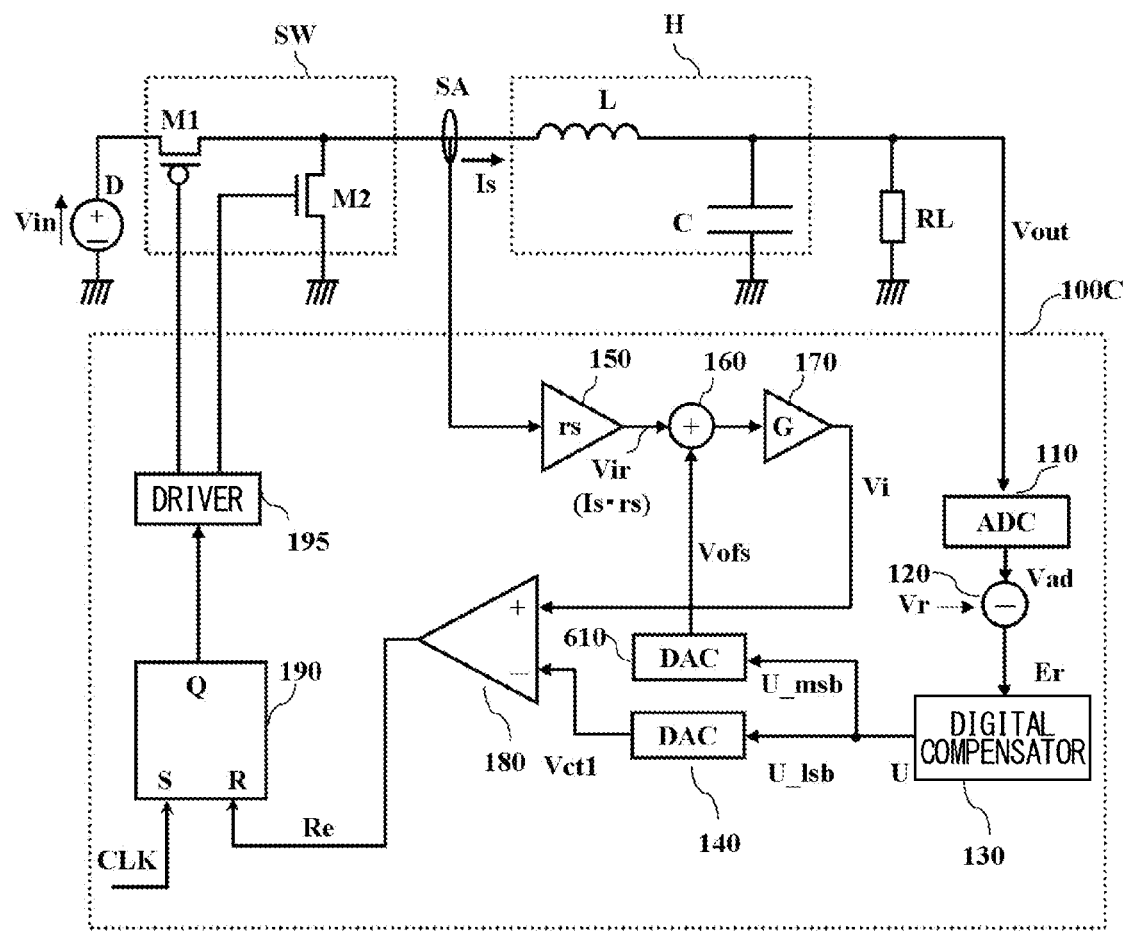
FIG. 8 A block diagram showing the overall configuration of a switching power supply control circuit according to a third embodiment of the present invention.

FIG. 8 shows a switching power supply control circuit 10C according to a third embodiment of the present invention. The difference from the first embodiment (FIG. 1) is that a switching controller 100C is designed such that a DAC 610 generates the offset voltage Vofs, and therefore, a high-order bit U_msb of the digital compensation value U outputted by the digital compensator 130 is inputted to the DAC 610. The switching controller is also designed such that the DAC 140 converts a low-order bit U_lsb of the digital compensation value U from digital to analog, and the converted output signal Vct 1 is inputted to an inverting input terminal of the analog comparator 180. With the third embodiment, the offset voltage Vofs was generated on the basis of the high-order bit U_msb of the digital compensation value U, the low-order bit U_lsb of the digital compensation value U was converted from digital to analog by the DAC 140, and the converted valued was inputted to the analog comparator 180. When these are replaced, however, the offset voltage Vofs can no longer be set at close to 1 V, which causes problems. The circuit structure according to the third embodiment allows the offset voltage Vofs to be set to several levels digitally, allowing the circuit operation points of the amplifier 170 to be set freely.

Fourth Embodiment

Figure 9:
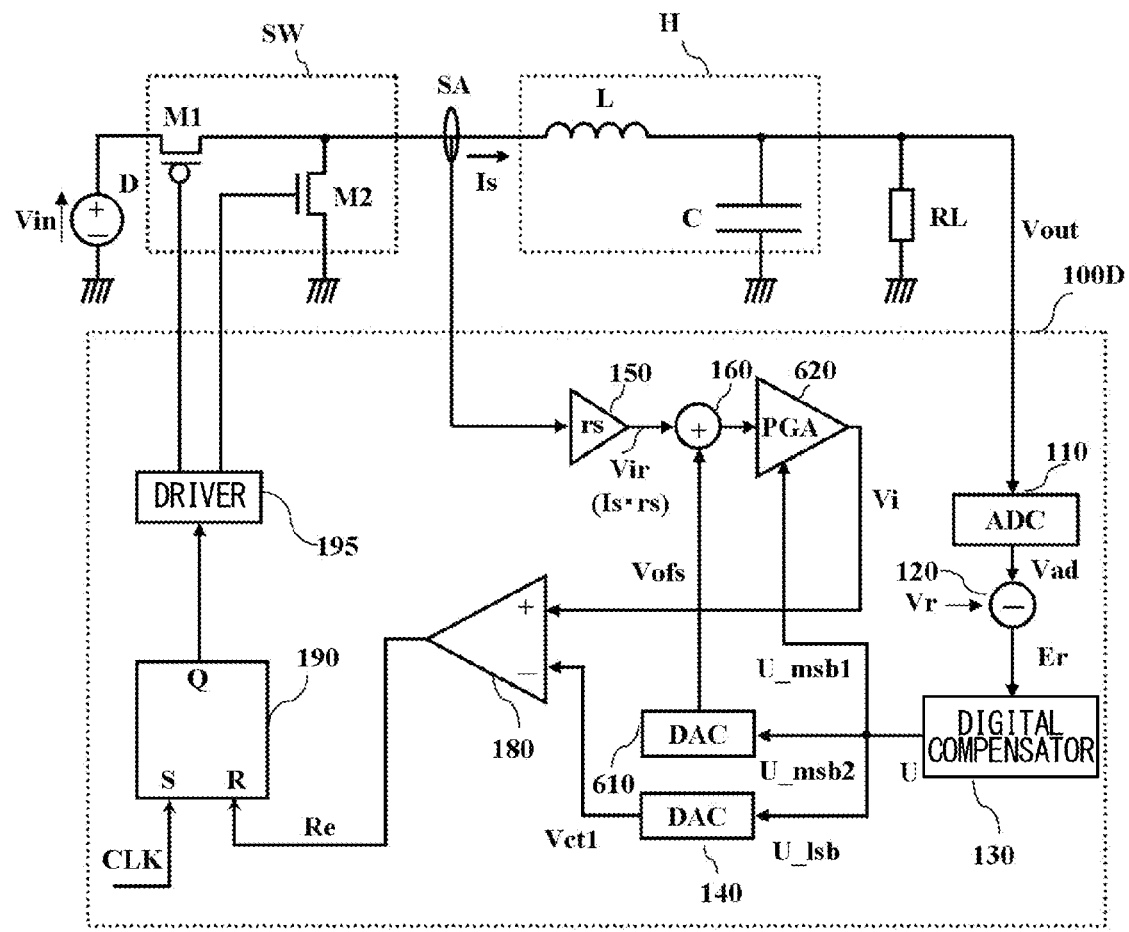
FIG. 9 A block diagram showing the overall configuration of a switching power supply control circuit according to a fourth embodiment of the present invention.

FIG. 9 shows a switching power supply control circuit 10D according to a fourth embodiment of the present invention. The difference from the first embodiment (FIG. 1) is that a switching controller 100D is designed such that a DAC 610 generates the offset voltage Vofs, and the DAC 610 converts a high-order bit U_msb2 of the digital compensation value U outputted by the digital compensator 130 from digital to analog. The switching controller is also designed such that the DAC 140 converts a low-order bit U_lsb of the digital compensation value U from digital to analog, and the converted output signal Vct1 of the DAC 140 is inputted to an inverting input terminal of the analog comparator 180. A variable gain amplifier PGA620 is also employed. The variable gain amplifier PGA620 is a variable gain amplifier replacing the amplifier 170. The gain of the variable gain amplifier PGA620 is controlled by a high-order bit U_msb1 of the digital compensation value U. Although separate high-order bits are used, in which the high-order bit U_msb1 of the digital compensation value U is used to adjust the gain of the variable gain amplifier PGA620 and another high-order bit U_msb2 is inputted to the DAC 610, the high-order bit U_msb1 and the high-order bit U_msb2 may be exactly the same. Although the gain of the amplifier 170 shown in FIGS. 1, 7, and 8 was fixed, the gain G of the variable gain amplifier PGA620 shown in FIG. 9 can be adjusted. Consequently, the DAC 140 can be applied to a wide range of signals from lower-bit to higher-bit signals, and the detection precision of the output current Is can be increased more by increasing the gain.

Fifth Embodiment

Figure 10:
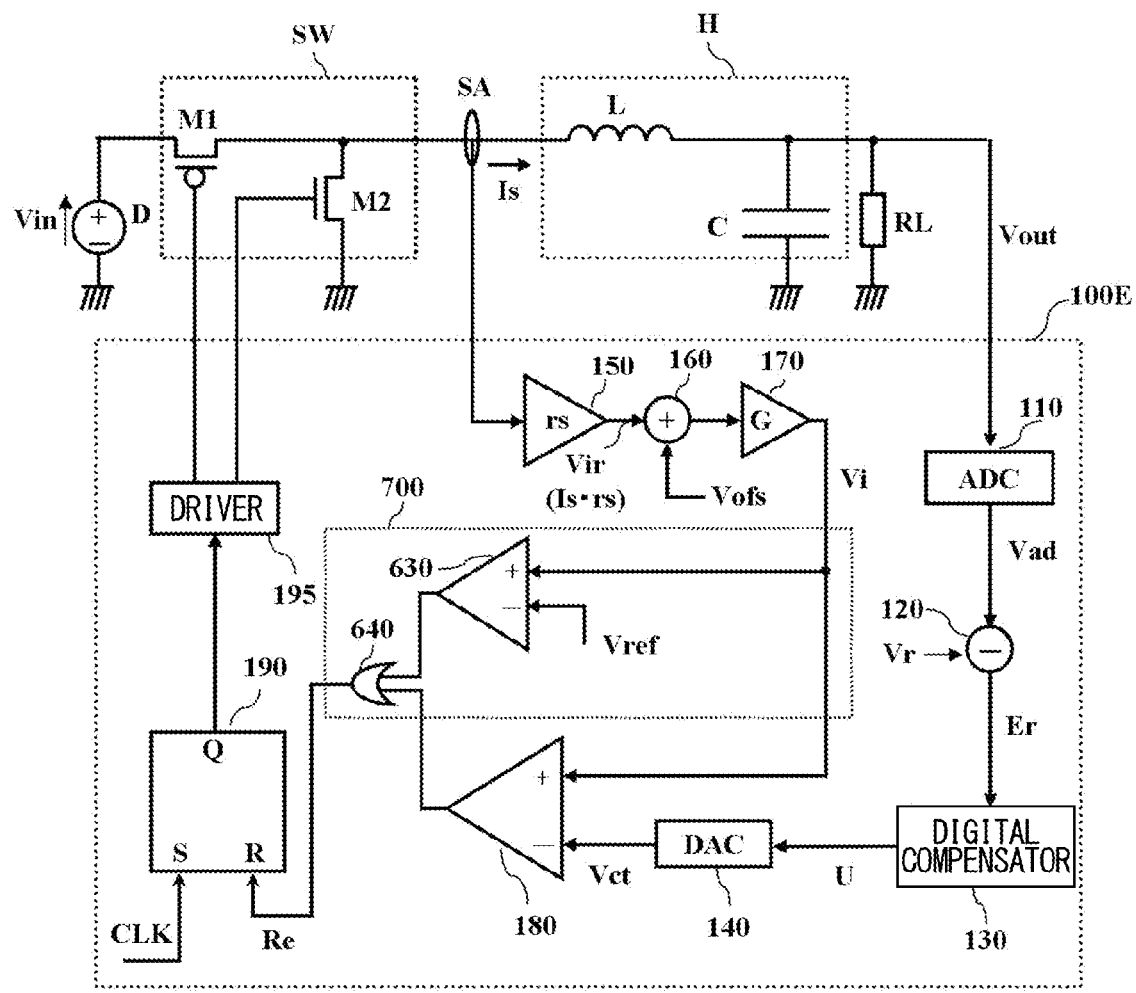
FIG. 10 A block diagram showing the overall configuration of a switching power supply control circuit according to a fifth embodiment of the present invention.

FIG. 10 shows a switching power supply control circuit 10E according to a fifth embodiment of the present invention. Generally, this type of switching regulator is often provided with an overcurrent protection circuit. A switching portion 100E according to the present invention is provided with an overcurrent protection circuit 700 having an analog comparator 630 and an OR circuit 640. Although the OR circuit 640 was used in the fifth embodiment, constructing an equivalent circuit using a combination of different logic circuits not limited to an OR circuit would be self-evident to a person skilled in the art.

The amplifier 170 applies the same signal as the current detection signal Vi inputted to the analog comparator 180, to a non-inverting input terminal of the analog comparator 630. A reference voltage Vref is applied to an inverting input terminal of the analog comparator 630. The size of the reference voltage Vref is selected so as to have a predetermined relationship with the output voltage Vout. In the case that the voltage level of the current detection signal Vi is greater than the reference voltage Vref, it is determined that there has been an influx of a predetermined or greater overcurrent into the switching element SW and the smoothing circuit H, and the output of the analog comparator 630 is made a high level. The output signal of the comparator 630 is applied to one of the input terminals of the OR circuit 640.

The output signal of the analog comparator 180 is applied to the other input terminal of the OR circuit 640, and both of these signals are subjected to an OR operation by the OR circuit 640. Should the output signal of the analog comparator 630 become a high level, the signal is determined to be in an overcurrent state, the output signal of the OR circuit 640 is made a high level, and the flip-flop 190 is forcibly reset to stop or decrease the current flowing from the p-channel field effect transistor M1 to the smoothing circuit H.

Sixth Embodiment

Figure 11:
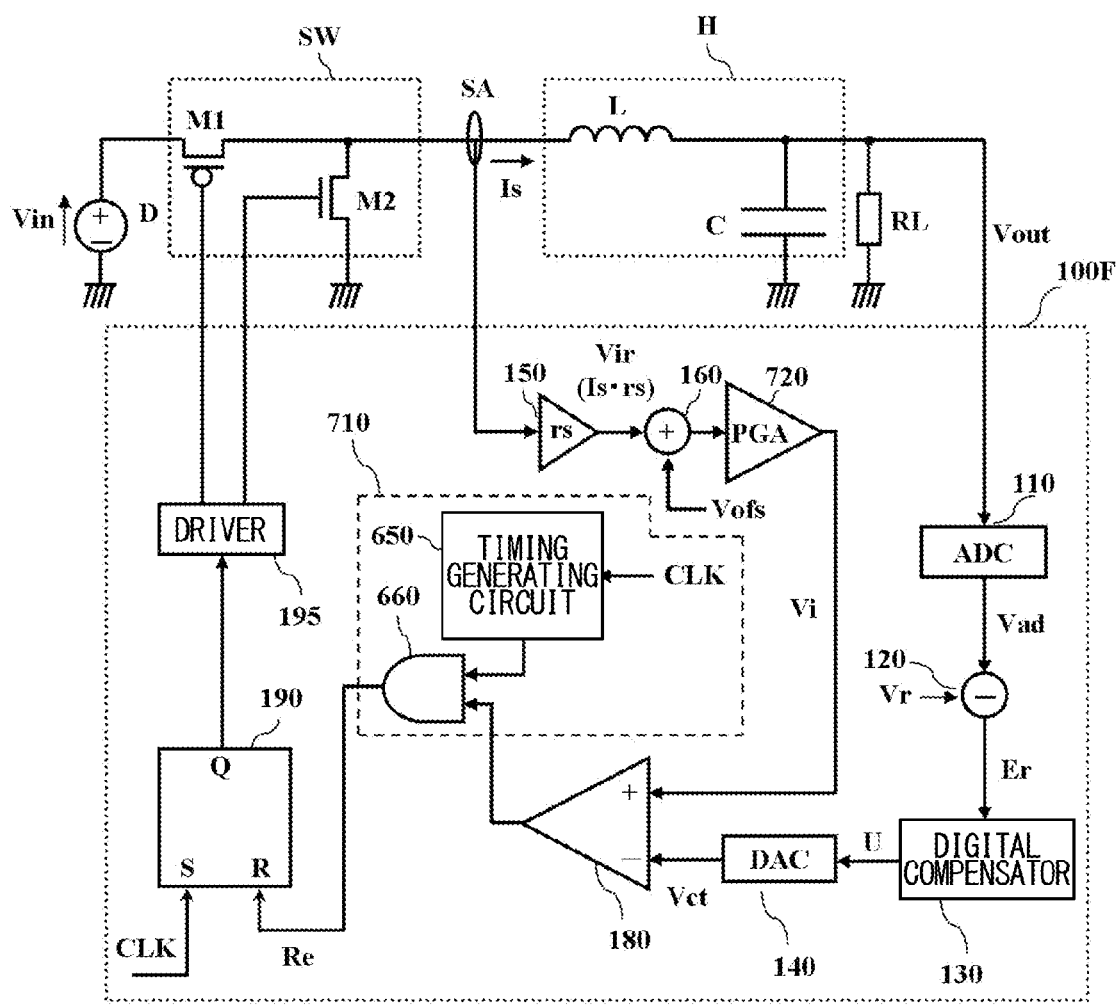
FIG. 11 A block diagram showing the overall configuration of a switching power supply control circuit according to a sixth embodiment of the present invention.

FIG. 11 shows a switching power supply control circuit 10F according to a sixth embodiment of the present invention. Regardless of whether the switching regulator is current mode or voltage mode, or a step-down, step-up, step-up/step-down, inverting, insulated, or non-insulated type, the switching element generates noise when turning on and off to generate a power supply voltage. Such noise often causes malfunction. Especially among current mode switching regulators, a peak current mode type is known to be more prone to the influence of noise than an average current mode type. With the sixth embodiment of the present invention, a switching controller 100F is provided with a mixing circuit 710, and the operation of the switching element SW is stopped for a predetermined interval to minimize such malfunction. The mixing circuit 710 is also called a blanking circuit. The mixing circuit 710 has a timing generating circuit 650 and an AND circuit 660. Although the AND circuit 660 was used in the sixth embodiment, constructing an equivalent circuit using a combination of different logic circuits not limited to an AND circuit would be self-evident to a person skilled in the art. The timing generating circuit 650 generates a blanking (masking) pulse having a predetermined time delay and a predetermined pulse width with reference to the clock signal CLK. The blanking pulse generated by the timing generating circuit 650 and the signal outputted by the analog comparator 180 are applied to the AND circuit 660, both signals are subjected to an AND operation by the AND circuit 66, and the computed result signal is fetched as a reset signal Re of the flip-flop 190. In the case that both signals are, for example, a high level, the flip-flop 190 is reset, which can eliminate the problem of mistakenly detecting noise due to, for example, switching the field effect transistor M1 or M2, and resetting the flip-flop 190.

Seventh Embodiment

Figure 12:
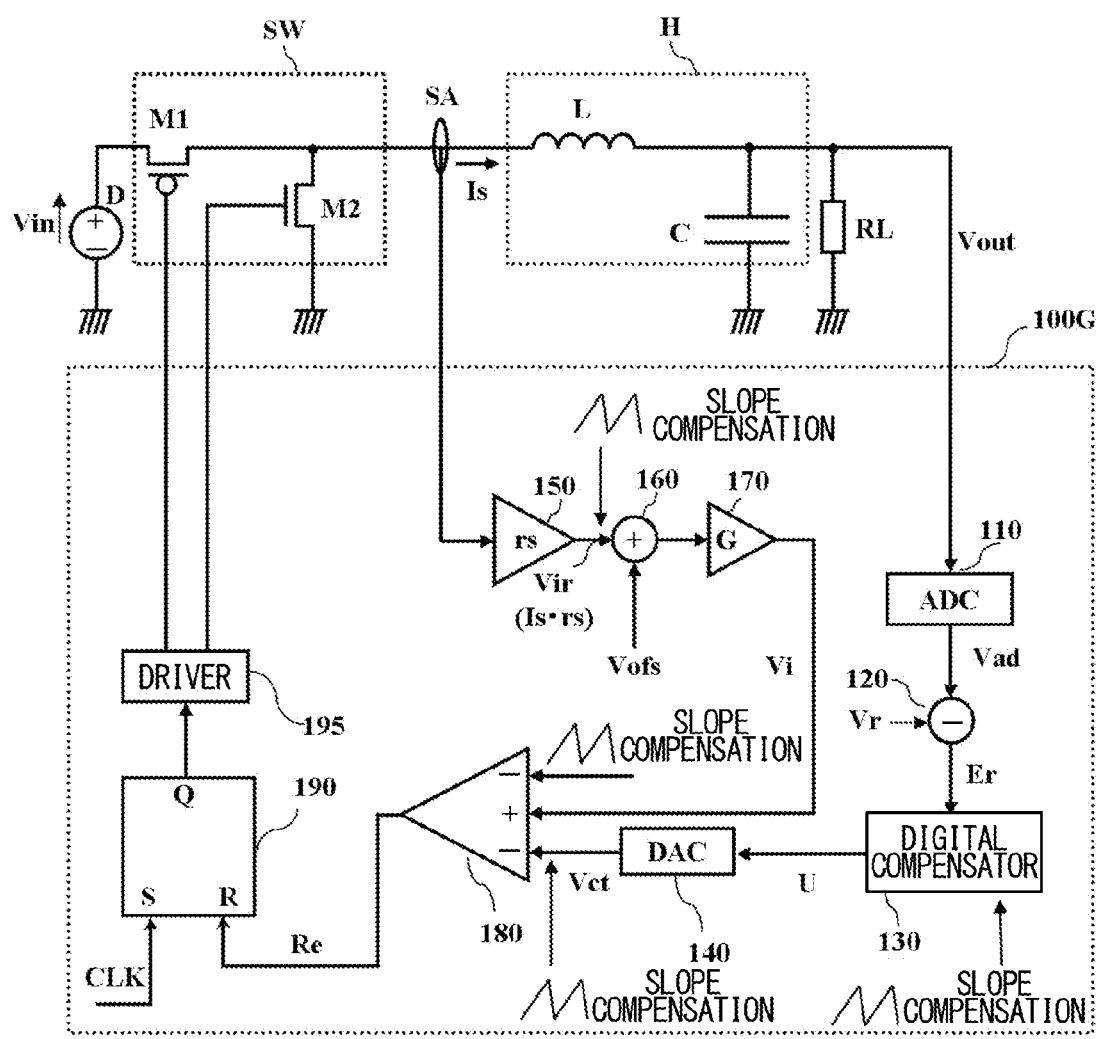
FIG. 12 A block diagram showing the overall configuration of a switching power supply control circuit according to a seventh embodiment of the present invention.

FIG. 12 shows a switching power supply control circuit 10G according to a seventh embodiment of the present invention. It is known that a current mode switching regulator using PWM undergoes subharmonic oscillation and becomes uncontrollable when on duty for more than 50%. A switching controller 100G having slope compensation was prepared to minimize such problems. A slope compensation circuit configured to carry out slope compensation may be, for example, coupled between the I-V converter 150 and the adder 160, disposed on the side of the digital compensator 130, or disposed on the side of the analog comparator 180. For example, a slope compensation signal generating circuit configured to apply a slope compensation signal may be coupled on the input side of the analog comparator 180.

Advantageous Effects of the Invention

The present invention has excellent resolution without employing a high-bit DAC and can reduce oscillation of an output voltage to improve response by employing an analog comparator, by designing so as to convert a current flowing into a switching element to a voltage on the basis, specifically, of the value of a previous output current flowing into a smoothing circuit, to offset the converted voltage to shift to an easily amplifiable level, and to amplify using an amplifier to a level which can be detected later by an analog comparator.

INDUSTRIAL APPLICABILITY

The present invention can provide an inexpensive, high-precision current mode switching regulator capable of having excellent resolution without employing a high-bit DAC and reducing oscillation of an output voltage by employing an analog comparator, and as such, has very high industrial applicability.

What is claimed is:

1. A switching power supply control circuit comprising:
a switching element;
a smoothing circuit; and
a switching control circuit configured to control the switching element;
wherein the switching control circuit comprising:
an I-V converter configured to multiply an output current flowing to the switching element by a predetermined conversion coefficient to generate an I-V conversion voltage;
an amplifier configured to amplify the I-V conversion voltage to which has been added an offset voltage, and generating a current detection signal;
a first DAC configured to convert a digital compensation value computed from an output voltage of the smoothing circuit to an analog converted value;
a first analog comparator configured to compare the current detection signal with the analog converted value and generating a first comparison result signal;
a driver configured to control the switching element on the basis of the first comparison result signal; and
a second DAC configured to generate the offset voltage, the second DAC converting a high-order bit of the digital compensation value to the offset voltage; and
the first DAC converting a low-order bit of the digital compensation value to the analog converted value.

2. The switching power supply control circuit of claim 1, wherein the switching power supply control circuit is used in a non-insulated switching regulator in which a transformer is not used.

3. The switching power supply control circuit of claim 1, the amplifier being an operational amplifier.

4. The switching power supply control circuit of claim 1, wherein a gain G is set on the basis of $G \geq (Vdm/((2^n-1) \cdot rs \cdot Ismin)$, where G is the gain by the amplifier, rs is the conversion coefficient, n is the number of bits of the first DAC, Vdm is an output voltage range of the first DAC, and Ismin is a minimum detected current of the output current.

5. The switching power supply control circuit of claim 1, wherein the amplifier includes a variable gain amplifier; and
a voltage gain of the variable gain amplifier and the offset voltage can be varied according to the value of the high-order bit of the digital compensation value.

6. The switching power supply control circuit of claim 1, wherein the switching control circuit also comprises:
   a second analog comparator configured to compare the current detection signal with a reference voltage and generating a second comparison result signal; and
   a logic circuit configured to perform a logic operation on the first comparison result signal and the second comparison result signal and generating a logic operation signal;
   wherein the driver controls the switching element on the basis of the logic operation signal.

7. The switching power supply control circuit of claim 1, wherein the switching control circuit also comprises:
   a timing generating circuit configured to generate a timing generation signal that becomes high-level or low-level at a predetermined interval, from a clock signal; and
   a logic circuit configured to perform a logic operation on the first comparison result signal and the timing signal and generating a logic operation signal;
   wherein the driver controls the switching element on the basis of the logic operation signal.

8. The switching power supply control circuit of claim 1, wherein either the first analog comparator or a digital compensator is configured to generate the I-V conversion voltage and the digital compensation value being subjected to slope compensation configured to restrain subharmonic oscillation.

9. The switching power supply control circuit of claim 1, wherein the switching power supply control circuit is used in an insulated switching regulator in which a transformer is used.

10. A switching power supply control circuit comprising:
   a switching element;
   a smoothing circuit; and
   a switching control circuit configured to control the switching element;
   wherein the switching control circuit comprises:
      an I-V converter configured to multiply an output current flowing to the switching element by a predetermined conversion coefficient to generate an I-V conversion voltage;
      an amplifier configured to amplify the I-V conversion voltage to which has been added an offset voltage, and generating a current detection signal;
      a first DAC configured to convert a digital compensation value computed from an output voltage of the smoothing circuit to an analog converted value;
      a first analog comparator configured to compare the current detection signal with the analog converted value and generating a first comparison result signal;
      a driver configured to control the switching element on the basis of the first comparison result signal; and
      a digital compensator configured to generate the digital compensation value,
      wherein the digital compensator is inputted an error signal obtained by comparing a reference voltage with a converted voltage converted from analog to digital on the basis of the output voltage, the error signal is converted to a digitally controlled digital compensation value, and the digital compensation value is inputted to the first DAC,
      the digital control comprising PI control; and
      the digital compensator comprising:
         a first multiplier configured to multiply the sum of a constant of proportionality and a constant of integration by the error signal and outputting a first multiplication signal;
         a first delay circuit configured to output the error signal of the previous cycle as a first delay signal;
         a second multiplier configured to multiply the constant of proportionality by the first delay signal and outputting a second multiplication signal;
         an adder configured to output an addition signal obtained by adding the first multiplication signal and the second multiplication signal; and
         a second delay circuit configured to output the addition signal of the previous cycle to the adder as a second delay signal;
         wherein the digital compensator outputs the digital compensation value from the adder.

11. The switching power supply control circuit of claim 10, wherein the PI control is executed by a CPU; and
   the CPU comprising:
      a register group configured to separately store the constant of proportionality, the constant of integration, the error signal, the first multiplication signal, the second multiplication signal, the addition signal, and the digital compensation value;
      a data register configured to temporarily store data fetched from the register group;
      an arithmetic logic unit (ALU) configured to perform an arithmetic operation on the data stored in the data register; and
      an accumulator configured to temporarily store the arithmetic result obtained from the ALU.

12. A switching power supply control circuit comprising:
   a switching element;
   a smoothing circuit; and
   a switching control circuit configured to control the switching element;
   wherein the switching control circuit comprises:
      an I-V converter configured to multiply an output current flowing to the switching element by a predetermined conversion coefficient to generate an I-V conversion voltage;
      an amplifier configured to amplify the I-V conversion voltage to which has been added an offset voltage, and generating a current detection signal;
      a first DAC configured to convert a digital compensation value computed from an output voltage of the smoothing circuit to an analog converted value;
      a first analog comparator configured to compare the current detection signal with the analog converted value and generating a first comparison result signal;
      a driver configured to control the switching element on the basis of the first comparison result signal; and
      a second DAC configured to generate the offset voltage,
      the size of a voltage gain of the amplifier and the offset voltage being set on the basis of the high-order bit of the digital compensation value; and
      the first DAC converting the low-order bit of the digital compensation value to the analog converted value.

* * * * *